United States Patent
Li

(10) Patent No.: US 12,408,098 B2
(45) Date of Patent: Sep. 2, 2025

(54) WIRELESS NETWORK ACCESS METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 466 days.

(21) Appl. No.: 17/905,735

(22) PCT Filed: Mar. 5, 2020

(86) PCT No.: PCT/CN2020/078081
§ 371 (c)(1),
(2) Date: Sep. 6, 2022

(87) PCT Pub. No.: WO2021/174510
PCT Pub. Date: Sep. 10, 2021

(65) Prior Publication Data
US 2023/0120792 A1   Apr. 20, 2023

(51) Int. Cl.
*H04W 48/02* (2009.01)
*H04W 74/0833* (2024.01)

(52) U.S. Cl.
CPC ........ *H04W 48/02* (2013.01); *H04W 74/0833* (2013.01)

(58) Field of Classification Search
CPC .......... H04W 74/0833; H04W 52/50; H04W 74/004
See application file for complete search history.

(56) References Cited

U.S. PATENT DOCUMENTS

| | | | |
|---|---|---|---|
| 2019/0082451 A1 | 3/2019 | Yun et al. | |
| 2019/0215749 A1 | 7/2019 | Shih et al. | |
| 2019/0239167 A1* | 8/2019 | Liu | H04W 74/0833 |
| 2019/0246391 A1 | 8/2019 | Zhang et al. | |
| 2019/0254071 A1* | 8/2019 | Park | H04W 74/006 |
| 2019/0254073 A1 | 8/2019 | Sheng et al. | |
| 2020/0015236 A1 | 1/2020 | Kung et al. | |
| 2020/0107369 A1* | 4/2020 | Jeon | H04W 74/006 |
| 2020/0314633 A1 | 10/2020 | Tang | |

(Continued)

FOREIGN PATENT DOCUMENTS

| | | |
|---|---|---|
| CN | 108353408 A | 7/2018 |
| CN | 109392181 A | 2/2019 |
| CN | 109803317 A | 5/2019 |

(Continued)

OTHER PUBLICATIONS

Combined Chinese Office Action and Search Report issued on Oct. 8, 2022 in Chinese Patent Application No. 202080000482.4 (with English translation), 15 pages.

(Continued)

*Primary Examiner* — Yee F Lam
(74) *Attorney, Agent, or Firm* — Oblon, McClelland, Maier & Neustadt, L.L.P.

(57) ABSTRACT

A method and device for accessing a wireless network are provided. In the method, it is determined, according to a type of a terminal, whether the terminal is allowed to access the wireless network over an SUL carrier.

18 Claims, 9 Drawing Sheets

(56) References Cited

U.S. PATENT DOCUMENTS

2021/0250991 A1* 8/2021 Liu .................. H04W 74/02
2021/0274554 A1* 9/2021 Cozzo ............... H04W 74/0833

FOREIGN PATENT DOCUMENTS

| | | | |
|---|---|---|---|
| CN | 109803332 A | 5/2019 | |
| CN | 109845370 A | 6/2019 | |
| CN | 110049516 A | 7/2019 | |
| CN | 110049557 A | 7/2019 | |
| CN | 110557821 A | 12/2019 | |
| CN | 110831210 A | 2/2020 | |
| EP | 4 082 289 A4 | 1/2023 | |
| WO | WO 2019/095107 A1 | 5/2019 | |
| WO | WO 2019/192336 A1 | 10/2019 | |
| WO | WO 2021/172937 A1 | 9/2021 | |

OTHER PUBLICATIONS

Motorola Mobility, "Addition of new MAC UL TBS test case with transform precoding configured", 3GPP TSG-RAN WG5 Meeting #80, R5-184528, Gothenburg, Sweden, Aug. 20-24, 2018, pp. 1-12.

International Search Report issued Jul. 21, 2021, in PCT/CN2020/078081 filed Mar. 5, 2020, 3 pages.

"Discussion on Pcompensation type parameters in S-criteria for NR", CMCC, 3GPP TSG-RAN WG4 Meeting #86, R4-1801582, Mar. 2018, 6 pages.

Extended European Search Report issued Nov. 3, 2023, in corresponding European Patent Application No. 20923506.8, 13 pages.

OPPO: "Discussion on RACH issue and UE capability for the SUL operation", 3GPP Draft; R2-1712247, vol. RAN WG2, No. Reno, USA; Nov. 27, 2017-Dec. 1, 2017, Nov. 17, 2017, XP051371373, Retrieved from the Internet on Nov. 17, 2017 URL:http://www.3gpp.org/ftp/tsg%5Fran/WG2%5FRL2/TSGR2%5F100/Docs/ 5 pages.

Combined Chinese Office Action and Search Report issued May 26, 2023 in Patent Application No. 202080000482.4 (with English translation of Category of Cited Documents), 5 pages.

ZTE, et al., "Discussion on SUL carrier," 3GPP TSG RAN WG1 Meeting #99bis, R2-1710899, Oct. 2017, 6 pages.

ZTE, et al., "Discussion on SUL carrier," 3GPP TSG RAN WG1 Meeting #99bis, R2-1711841, Oct. 2017, 6 pages.

Vivo, "Random Access with SUL and corresponding Text Proposal," 3GPP TSG-RAN WG2 Meeting #100, R2-1712762, 2017, 4 pages.

Huawei, et al., "Correction in 38321 for the selection of UL carrier for random access," 3GPP TSG-RAN WG2 Meeting AH1801, R2-1810006, May 2018, 4 pages.

* cited by examiner

WIRELESS NETWORK ACCESS METHOD AND APPARATUS, COMMUNICATION DEVICE, AND STORAGE MEDIUM

CROSS-REFERENCE TO RELATED APPLICATIONS

The present application is a U.S. National Stage of International Application No. PCT/CN2020/078081 filed on Mar. 5, 2020, the entire contents of which are incorporated herein by reference for all purposes.

BACKGROUND OF THE INVENTION

Field of the Invention

The present disclosure relates but is not limited to the field of wireless communication, and particularly, to a method and device for accessing a wireless network, a communication device and a storage medium.

Description of the Related Art

The supplementary uplink (SUL) characteristic is introduced into the new radio (NR) system to improve an uplink coverage capability of the new radio system. That is, one downlink carrier and two uplink carriers are configured in a same cell. Here, the two uplink carriers are an SUL carrier and a non-SUL carrier, respectively. At the same time, a terminal can only select one carrier for uplink transmission of physical uplink shared channel (PUSCH). In the NR system, after a supplementary uplink characteristic is introduced, in order to prevent all terminals in the NR system from initiating random access to the SUL carrier, only the terminal located at the edge of the cell is allowed to initiate the random access to the SUL carrier.

In R17, a new type of terminal with reduced capability is introduced for the new radio-light (NR-Light), and such terminal is designed for a scenario other than ultra reliable & low latency communication (URLLC), massive machine type communication (mMTC) and enhanced mobile bandwidth (eMBB) of R15/R16. The rate, latency, and reliability required by this new type of terminal with reduced capability are not covered by the above scenarios. For example, the rate of the new type of terminal with reduced capability when transmitting data is required to be lower than that of the eMBB and higher than that of the mMTC, and the latency and reliability required by the new type of terminal with reduced capability are lower than that of the URLLC.

In R17, after the introduction of the new type of terminal with reduced capability for the characteristic of the NR-light, the number of antennas of the terminal is reduced, and there are higher requirements for uplink coverage enhancement. Therefore, this new type of terminal with reduced capability needs to work on the SUL carrier as much as possible. However, the access method that only allows the terminal located at the edge of the cell to initiate the random access to the SUL carrier cannot well satisfy the access requirements of this new type of terminal with reduced capability, and cannot enhance the uplink coverage ability of the network.

SUMMARY OF THE INVENTION

Embodiments of the present disclosure provide a method and device for accessing a wireless network, a communication device and a storage medium.

A first aspect of embodiments of the present disclosure provides a method for accessing a wireless network, including determining, according to a type of a terminal, whether the terminal is allowed to access the wireless network over a supplementary uplink (SUL) carrier.

A second aspect of embodiments of the present disclosure further provides a device for accessing a wireless network, including a determination module, configured to determine, according to a type of a terminal, whether the terminal is allowed to access the wireless network over a supplementary uplink (SUL) carrier.

A third aspect of embodiments of the present disclosure further provides a communication device, including an antenna, a memory, and a processor, respectively coupled to the antenna and the memory. The processor being configured to, by executing non-transitory executable programs stored in the memory, control the antenna to transmit and receive wireless signal and perform the steps in the method according to any one of the above-described technical solutions.

A fourth aspect of embodiments of the present disclosure further provides a non-transitory computer-readable storage medium storing executable programs which, when being executed by a processor, can implement the steps in the method according to any one of the above-described technical solutions.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the exemplary embodiments below are not intended to represent all implementations of the embodiments of the present disclosure. Rather, they are merely examples of devices and methods according to some aspects of the embodiments of the present disclosure as recited in the appended claims.

The terminology used in the embodiments of the present disclosure is for the purpose of describing particular embodiments only and is not intended to limit the embodiments of the present disclosure. As used in the embodiments of the present disclosure and the appended claims, the singular forms "a", "an" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third and the like may be used in the embodiments of the present disclosure to describe various pieces of information, such information should not be limited by these terms. These terms are only used to distinguish the same type of information from each other. For example, first information may also be referred to as second information, and similarly, the second information may also be referred to as the first information, without departing from the scope of the embodiments of the present disclosure. Depending on the context, the word "if" as used herein may be interpreted as "at the time of" or "when" or "in response to determining".

Figure 1:
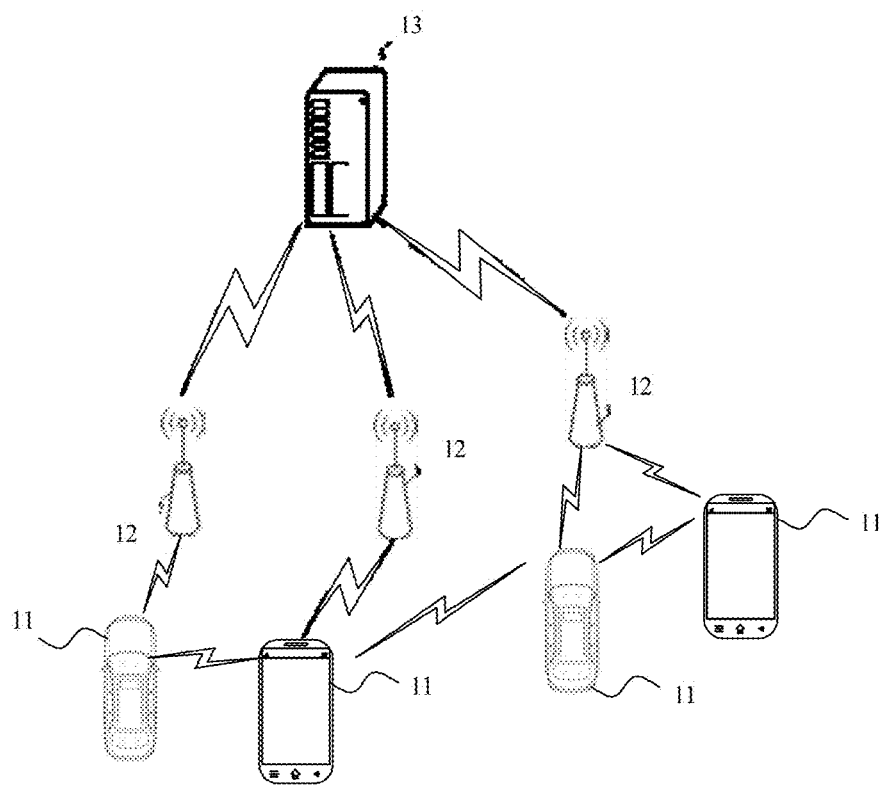
FIG. 1 is a schematic structural diagram of a wireless communication system according to an embodiment of the present disclosure.

FIG. 1 shows a schematic structural diagram of a wireless communication system according to an embodiment of the present disclosure. As shown in FIG. 1, the wireless communication system is a communication system based on cellular mobile communication technology, and may include a plurality of terminals 11 and a plurality of base stations 12.

The terminal 11 may be a device that provides voice and/or data connectivity to a user. The terminal 11 may communicate with one or more core networks via radio access network (RAN). The terminal 11 may be an IoT terminal such as a sensor device, a mobile phone (or "cellular" phone), and may be a computer having the IoT terminal, which, for example, may be a stationary, portable, pocket-sized, hand-held, computer-built-in, or vehicle-mounted device. For example, the terminal 11 may be a station (STA), subscriber unit, subscriber station, mobile station (mobile station), mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be an in-vehicle device, for example, a trip computer with a wireless communication function, or a wireless communication device connected to an external trip computer. Alternatively, the terminal 11 may also be a roadside device, for example, may be a streetlight, a signal light, or other roadside device having a wireless communication function.

The base station 12 may be a network-side device in a wireless communication system. The wireless communication system may be a 4th generation mobile communication (4G) system, also known as a long term evolution (LTE) system. Alternatively, the wireless communication system may be a 5G system, also known as a new radio (NR) system or a 5G NR system. Alternatively, the wireless communication system may be a next-generation system of the 5G system. The access network in the 5G system may be called NG-RAN (New Generation-Radio Access Network). Alternatively, it may be a MTC system.

The base station 12 may be an evolved base station (eNB) employed in the 4G system. Alternatively, the base station 12 may be a base station (gNB) that adopts a centralized distributed architecture in the 5G system. When adopting the centralized distributed architecture, the base station 12 usually includes a central unit (CU) and at least two distributed units (DUs). The central unit is provided with a protocol stack of a packet data convergence protocol (PDCP) layer, a radio link control (RLC) layer, and a medium access control (MAC) layer. The distributed unit is provided with a physical (PHY) layer protocol stack. The specific implementation manner of the base station 12 is not limited in the embodiments of the present disclosure.

A wireless connection may be established between the base station 12 and the UE 11 through a wireless radio. In different embodiments, the wireless radio is a wireless radio based on the fourth generation mobile communication network technology (4G) standard; or the wireless radio is a wireless radio based on the fifth generation mobile communication network technology (5G) standard, for example, the wireless radio is a new radio; or, the wireless radio may also be a wireless radio of a 5G-based next generation mobile communication network technology standard.

In some embodiments, an E2E (end-to-end) connection may also be established between the terminals 11, for example, in scenarios such as V2V (vehicle to vehicle) communication, V2I (vehicle to infrastructure) communication and V2P (vehicle to pedestrian) communication in vehicle to everything (V2X) communication.

In some embodiments, the above wireless communication system may further include a network management device 13.

The plurality of base stations 12 are respectively connected to the network management device 13. The network management device 13 may be a core network device in the wireless communication system, for example, the network management device 13 may be a mobility management entity (MME) in an evolved packet core network (EPC). Alternatively, the network management device may also be other core network devices, such as a serving gateway (SGW), public data network gateway (PGW), policy and charging rules function unit (PCRF), home subscriber server (HSS) or the like. The implementation of the network management device 13 is not limited in the embodiments of the present disclosure.

In order to better understand the technical solution described in any of the embodiments of the present disclosure, first, an SUL scenario is described in an embodiment.

Figure 2:
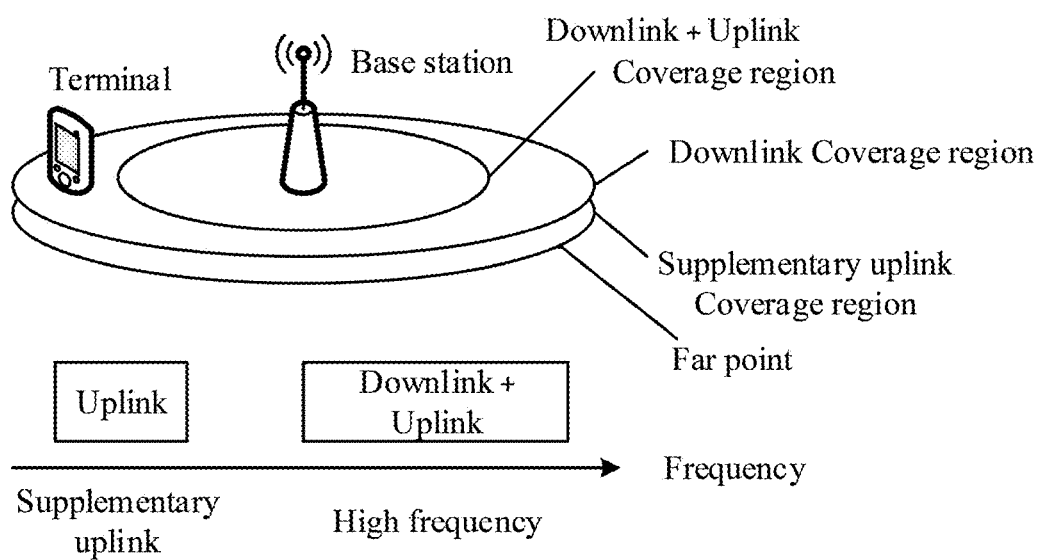
FIG. 2 is a schematic diagram of an assisted uplink SUL scenario provided by an embodiment of the present disclosure.

In an embodiment, referring to FIG. 2, a low frequency band (corresponding to an SUL carrier frequency band) is added in a place where there is no 3.5G uplink coverage (far point shown in FIG. 2) to transmit uplink data. By transmitting the NR downlink data of the 5G on the high frequency band and transmitting the NR uplink data of the 5G on the low frequency band, the uplink coverage of the 5G is improved. The SUL carrier may be in the same frequency band as the LTE uplink carrier. Compared with the NR carrier, the SUL carrier uses the low frequency band.

A terminal in an idle state selects a carrier for initial random access according to a threshold of reference signal receiving power (RSRP). The terminal initiates an initial random access (RA) over the supplementary uplink carrier only when detecting that the RSRP is lower than the threshold. Then the entire process in the random access channel (RACH) will be completed on the carrier. The random access process at this time is a competitive random access process. When the terminal has uplink data arrived and is in an uplink out-of-synchronization state, the terminal selects an uplink carrier to initiate the random access, the process of which is the same as that of the UE in the idle state. For the terminal in a connected state, the network may inform the terminal in the connected state on which uplink carrier to initiate the random access. For example, the network informs the terminal on which uplink carrier to initiate the random access in a dedicated command. At this time, the random access process is a non-competitive random access process.

In R17, a new type of terminal is introduced for a scenario other than enhanced mobile bandwidth (eMBB), ultra reliable & low latency communication (URLLC), and massive machine type communication (mMTC). There are three typical terminals which are factory sensor, video surveillance equipment, and wearable device. This new type of terminal has the following characteristics:
1. reduced number of antennas, for example, from 4 in R15 to 2 or 1.
2. reduced bandwidth, for example, the typical value of Frequency Range 1 (FR1) is 5 MHz/10 MHz, and the typical value of Frequency Range 2 (FR2) is 40 MHz.
3. reduced terminal processing capability, for example, it may support smaller transport blocks (TB) and downlink control information (DCI).

Here, the terminal of the new type has weak uplink coverage and needs to work on the SUL carrier as much as possible.

Figure 3:
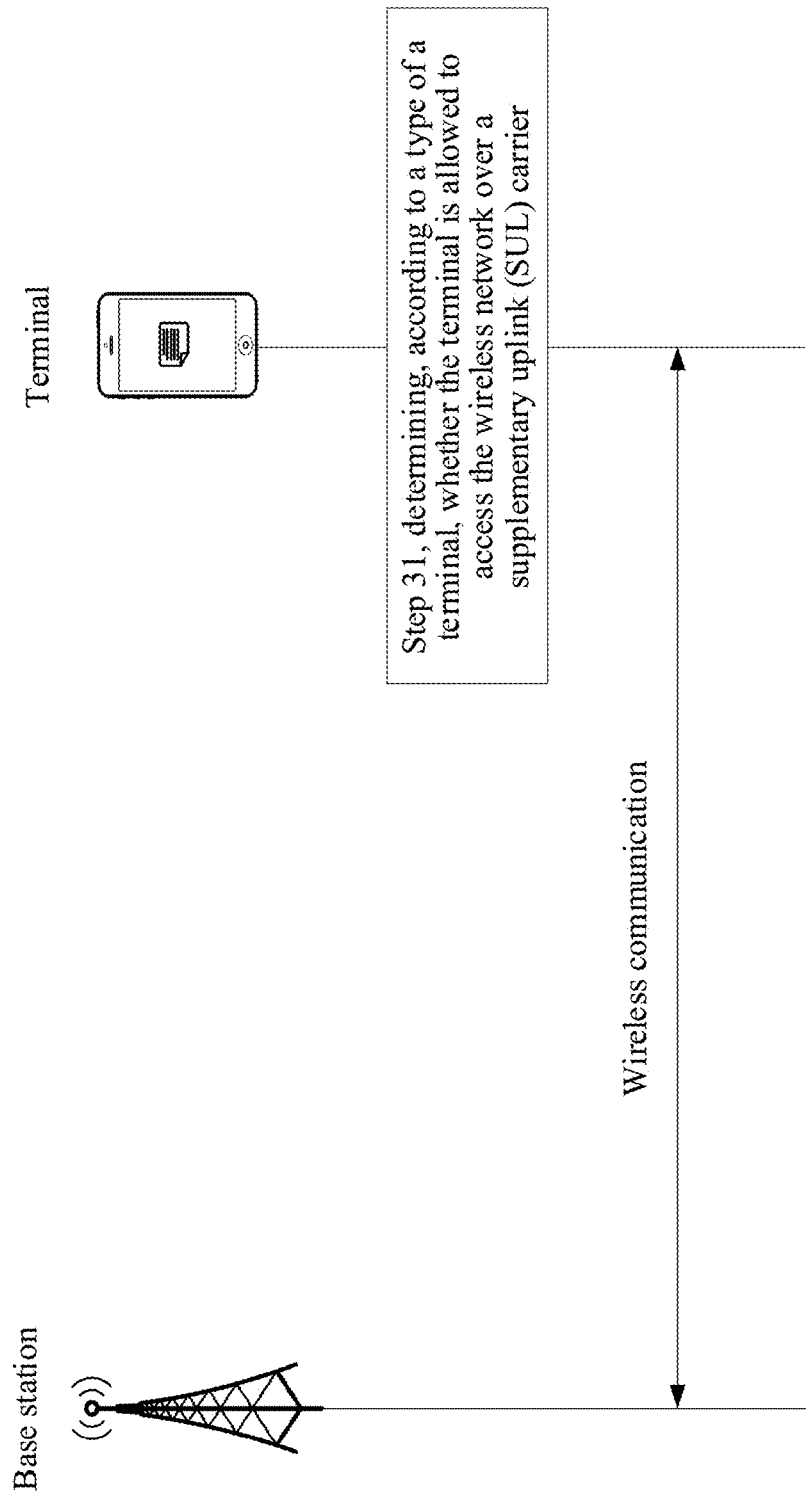
FIG. 3 is a schematic diagram of a method for accessing a wireless network according to an embodiment of the present disclosure.

As shown in FIG. 3, an embodiment of the present disclosure provides a method for accessing a wireless network, which is applied to a terminal. The method includes:

step 31, determining, according to a type of a terminal, whether the terminal is allowed to access the wireless network over a supplementary uplink (SUL) carrier.

In an embodiment, the terminal may include the following characteristics: 1. the number of antennas thereof is within a preset range; 2. a communication bandwidth thereof is low, that is, the terminal operates in a lower frequency band, for example, 5 MHz/10 MHz, 40 MHz and the like; 3. a data processing capability of the terminal is relatively weak, and the terminal can only process small transport blocks (TBs) and downlink control information (DCI).

Here, the terminal may be a factory sensor, video surveillance equipment, and wearable device. Here, the wearable device may be a smart watch, smart bracelet, smart helmet, and smart glasses.

In an embodiment, the type of the terminal may be distinguished according to a performance parameter required by the terminal during data transmission such as transmission rate, transmission latency, and transmission reliability. For example, if the transmission rate required by the terminal during data transmission is within a first rate range, the transmission latency required is within a first latency range, and the transmission reliability required satisfies a first condition, such terminal is a terminal of a first type. In an embodiment, when the rate requirement of the terminal for data transmission is lower than the requirement of enhanced mobile bandwidth (eMBB) and is higher than the requirement of massive machine type communication (mMTC), and the transmission latency and transmission reliability requirements of the terminal for data transmission are looser than the requirement of ultra reliable & low latency communication (URLLC), such terminal may be the terminal of the first type.

In an embodiment, the terminal may be determined to be the terminal of the first type according to one of the following terminal characteristics: the number of antennas of the terminal, the data transmission rate of the terminal, the modulation and coding mode adopted by the terminal, and the communication bandwidth supported by the terminal.

In an embodiment, the terminal determines the type of the terminal according to a number of antennas. For example, when the terminal has a predetermined number of antennas (e.g., only one antenna), it is determined that the terminal is of the first type.

In another embodiment, the terminal determines the type of the terminal according to a terminal capability. For example, when the bandwidth supported by the terminal is less than a preset threshold of 20 MHz, it is determined that the terminal is of the first type.

In an embodiment, the preset threshold may be notified to the terminal by means of dedicated signaling or broadcast signaling. Here, the dedicated signaling may be radio resource control (RRC) signaling.

In another embodiment, the preset threshold may be pre-agreed through a communication protocol. When the terminal is conducting communication, the preset threshold is determined according to the type of the communication protocol used for the communication.

In an embodiment, if the terminal operates in an enhanced coverage mode, it is determined that the terminal is of the first type. Here, determining whether the terminal operates in the enhanced coverage mode may include determining whether the terminal uses an RSRP smaller than a preset threshold when selecting a cell. For example, if the terminal selects the cell by using the RSRP smaller than the preset threshold, the terminal operates in the enhanced coverage mode after camping on the cell.

In an embodiment, when the type of the terminal satisfies a preset condition, the terminal is allowed to access the wireless network over the SUL carrier.

In another embodiment, when the type of the terminal does not satisfy the preset condition, the terminal is not allowed to access the wireless network over the SUL carrier. Here, when the type of the terminal does not satisfy the preset condition, the terminal may access the wireless network over a non-SUL carrier.

In the embodiment of the present disclosure, the terminal is determined, according to the type of the terminal, whether to be allowed to access the wireless network over the SUL carrier. In this way, when the type of the terminal is a terminal type that is allowed to access the wireless network over the SUL carrier, the terminal can access the wireless network over the SUL carrier. In comparison with the situation that only the terminal at the edge of the cell can access the wireless network over the SUL carrier, in the embodiment of the present disclosure, the terminals that are allowed, according to the type of the terminal, to access the wireless network over the SUL carrier can all access the wireless network within the cell range. Therefore, a terminal that needs to perform the wireless access over the SUL carrier directly performs the wireless access over the SUL carrier, or performs the wireless access over the SUL carrier in a looser condition than other terminals. Thus, the uplink coverage capability of the terminal that needs to perform the access over the SUL carrier is improved.

Figure 4:
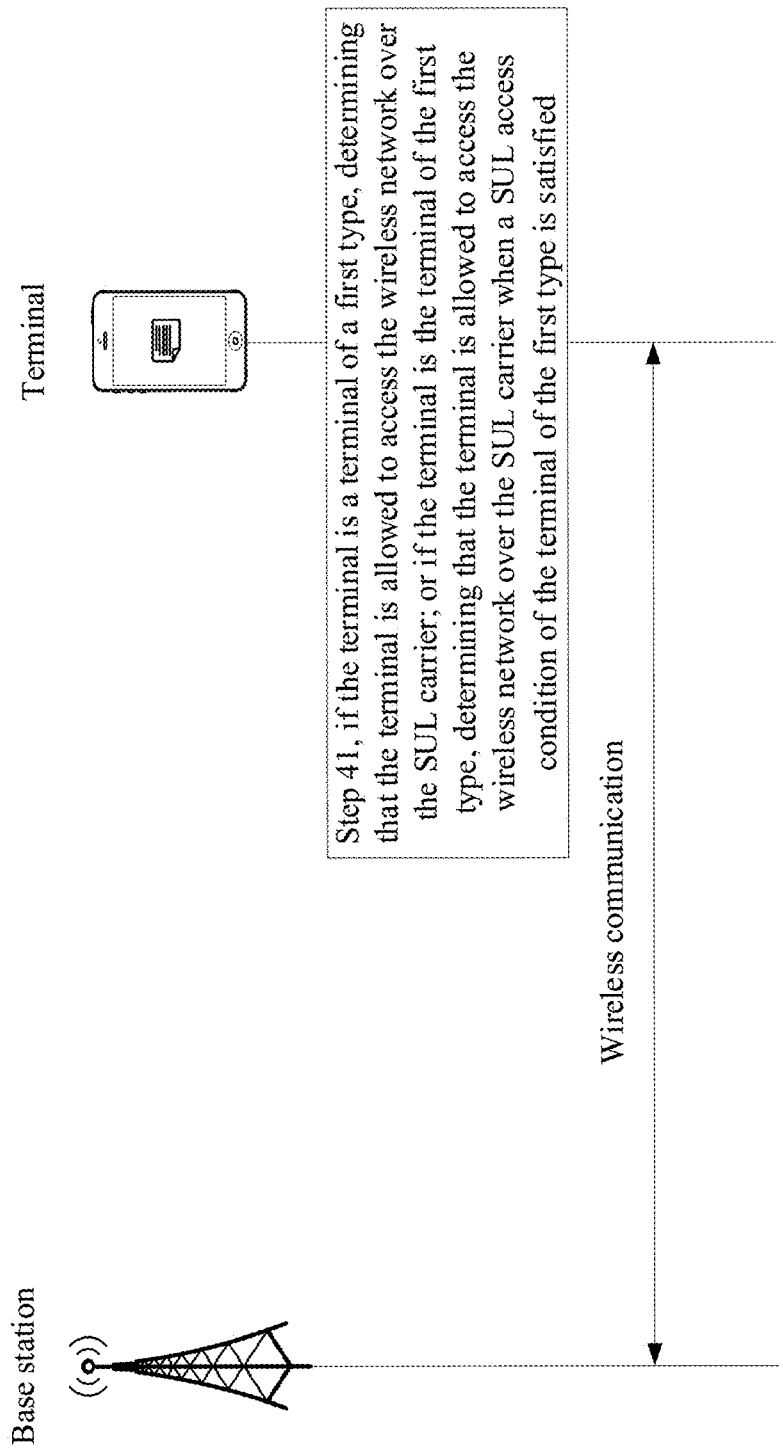
FIG. 4 is a schematic diagram of a method for accessing a wireless network according to another embodiment of the present disclosure.

As shown in FIG. 4, another embodiment of the present disclosure provides a method for accessing a wireless network. Determining, according to the type of the terminal, whether the terminal is allowed to access the wireless network over the SUL carrier in step 32 includes step 41, if the terminal is a terminal of a first type, determining that the terminal is allowed to access the wireless network over the SUL carrier.

In an embodiment, the terminal of the first type may be such a terminal that a transmission rate required by the terminal during data transmission is a first rate, a transmission latency required by the terminal during data transmission is a first latency, and a transmission reliability required by the terminal during data transmission satisfies a first condition.

Here, if the terminal is the terminal of the first type, the terminal may directly access the wireless network over the SUL carrier at any location in the cell, without being limited by other access conditions (for example, the reference signal receiving power (RSRP) is less than a preset threshold), which improves the uplink coverage capability of the terminal of the first type, so that the terminal of the first type can quickly access the wireless network.

Alternatively, if the terminal is the terminal of the first type, it is determined that the terminal is allowed to access the wireless network over the SUL carrier when a SUL access condition of the terminal of the first type is satisfied.

Further, the terminal may access the wireless network over a non-SUL carrier (i.e., a carrier other than the SUL carrier) when the SUL access condition of the terminal of the first type is not satisfied.

In an embodiment, the SUL access condition of the terminal of the first type may be that a reference signal receiving power (RSRP) detected by the terminal is less than a first power threshold. That is, when the terminal of the first type detects that the reference signal receiving power is greater than or equal to the first power threshold, it indicates that the current channel condition of the terminal of the first type is good, and the terminal may obtain a good coverage without accessing the wireless network over the SUL carrier. At this time, the SUL carrier may be idled for other terminals which needs a wireless access over the SUL carrier.

In an embodiment, the value of the first power threshold may be set according to the number of terminals of the first type in the cell. For example, when the number of terminals of the first type is greater than A, the first power threshold greater than B may be set; and when the number of terminals of the first type is less than A, the first power threshold less than B may be set. Here, when the signal is normal during wireless communication, the RSRP is usually greater than the set value. Only when the signal is poor, the RSRP will decrease. Here, the larger the first power threshold is set, the easier it is for the RSRP of the terminal to satisfy the condition of being less than the first power threshold, and the easier it is for the terminal of the first type to access the wireless network over the SUL.

Figure 5:
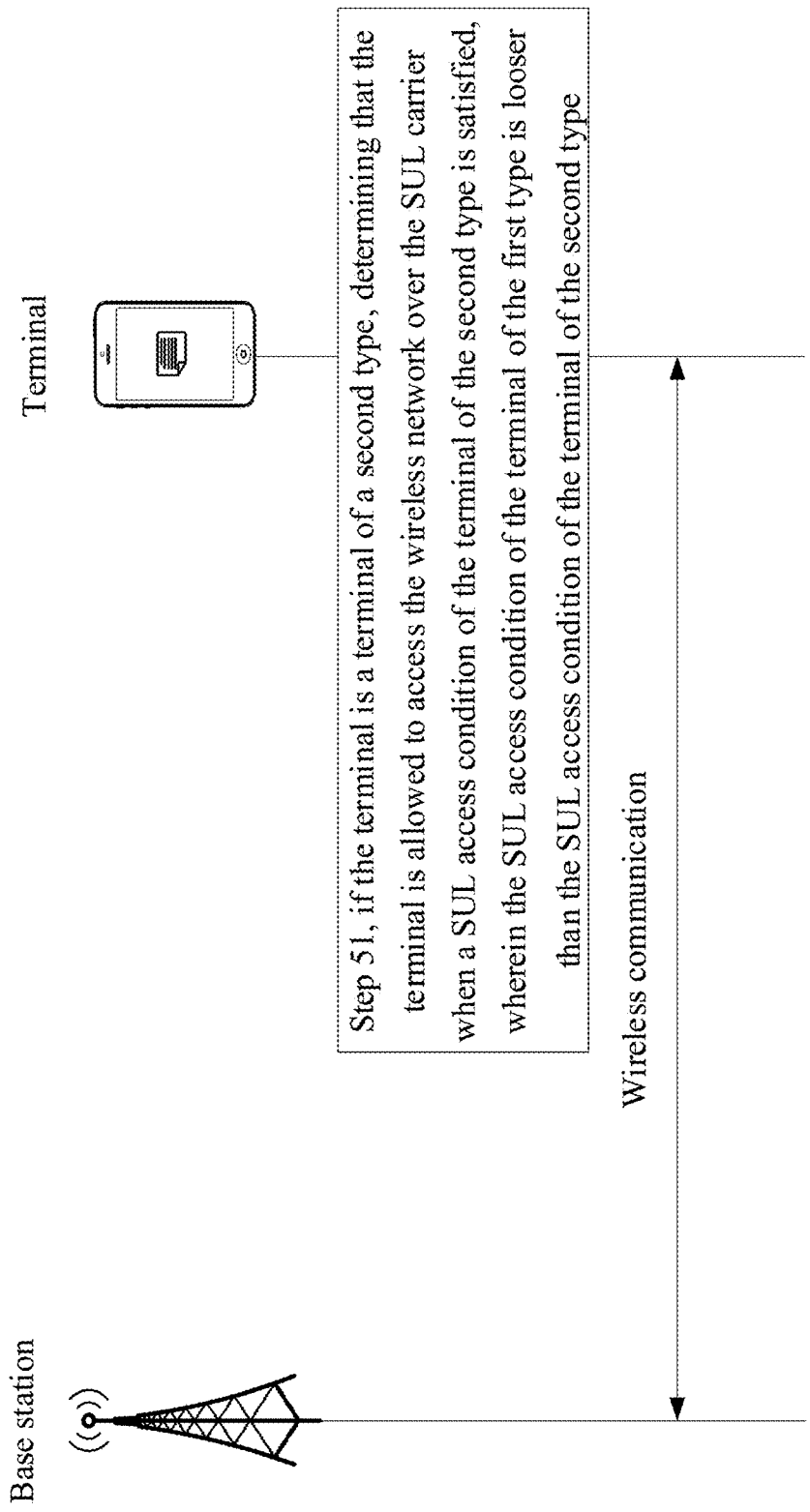
FIG. 5 is a schematic diagram of a method for accessing a wireless network according to another embodiment of the present disclosure.

As shown in FIG. 5, another embodiment of the present disclosure provides a method for accessing a wireless network. Determining, according to the type of the terminal, whether the terminal is allowed to access the wireless network over the SUL carrier in step 32 includes step 51, if the terminal is a terminal of a second type, determining that the terminal is allowed to access the wireless network over the SUL carrier when a SUL access condition of the terminal of the second type is satisfied.

The SUL access condition of the terminal of the first type is looser than the SUL access condition of the terminal of the second type. Here, the terminal of the first type is different from the terminal of the second type.

In an embodiment, the terminal of the first type may be such a terminal that a transmission rate required by the terminal during data transmission is a first rate, a transmission latency required by the terminal during data transmission is a first latency, and a transmission reliability required by the terminal during data transmission satisfies a first condition. The terminal of the second type may be such a terminal that a transmission rate required by the terminal during data transmission is a second rate, a transmission latency required by the terminal during data transmission is a second latency, and a transmission reliability required by the terminal during data transmission satisfies a second condition. Here, the first rate is lower than the second rate, the first latency is lower than the second latency, and the reliability required by the first condition is lower than the reliability required by the second condition.

In an embodiment, the SUL carrier access condition of the terminal of the second type may be that the RSRP detected by the terminal is less than a second power threshold.

In an embodiment, the value of the second power threshold may be set according to the number of terminals of the second type. For example, when the number of terminals of the second type is greater than C, the second power threshold less than D may be set; and when the number of terminals of the second type is less than C, the second power threshold greater than D may be set. Here, when the signal is normal during wireless communication, the RSRP is usually greater than the set value. Only when the signal is poor, the RSRP will decrease. Here, the smaller the second power threshold is set, the harder it is for the RSRP of the terminal of the second type to satisfy the condition of being less than the second power threshold, and the harder it is for the terminal of the second type with the large number to access the wireless network over the SUL.

In an embodiment, the SUL access condition of the terminal of the first type may be that the RSRP detected by the terminal is less than the first power threshold. The SUL carrier access condition of the terminal of the second type may be that the RSRP detected by the terminal is less than the second power threshold.

In an embodiment, the SUL access condition of the terminal of the first type being looser than the SUL access condition of the terminal of the second type may be that the first power threshold is greater than the second power threshold. When the signal is normal during wireless communication, the RSRP is usually larger than the set value. Only when the signal is poor, the RSRP will decrease. Here, the larger the power threshold is, the easier it is for the terminal to satisfy the condition that the RSRP is less than the power threshold. Since the first power threshold is greater than the second power threshold, it is easier for the terminal of the first type than the terminal of the second type to access the wireless network over the SUL, so as to ensure that the terminal of the first type that needs uplink coverage enhancement can access the wireless network over the SUL without being occupied by the terminal of the second type.

In the embodiment, on the one hand, both the terminal of the first type and the terminal of the second type can access the wireless network over the SUL carrier when the RSRP satisfies the conditions. In this way, when the wireless signal is weak, or when capability of the terminal for receiving and/or transmitting the wireless signal is weak, the terminal can access the wireless network over the SUL carrier, which improves the coverage capability of the wireless network. On the other hand, when the SUL access conditions are set for the terminal of the first type and the terminal of the second type, the SUL access condition of the terminal of the first type is looser than the SUL access condition of the terminal of the second type. In this way, it is easier for the terminal of the first type than the terminal of the second type to access the wireless network over the SUL carrier, so that the terminal of the first type may preferentially access the wireless network over the SUL carrier, and preferentially operates on the SUL carrier.

Figure 6:
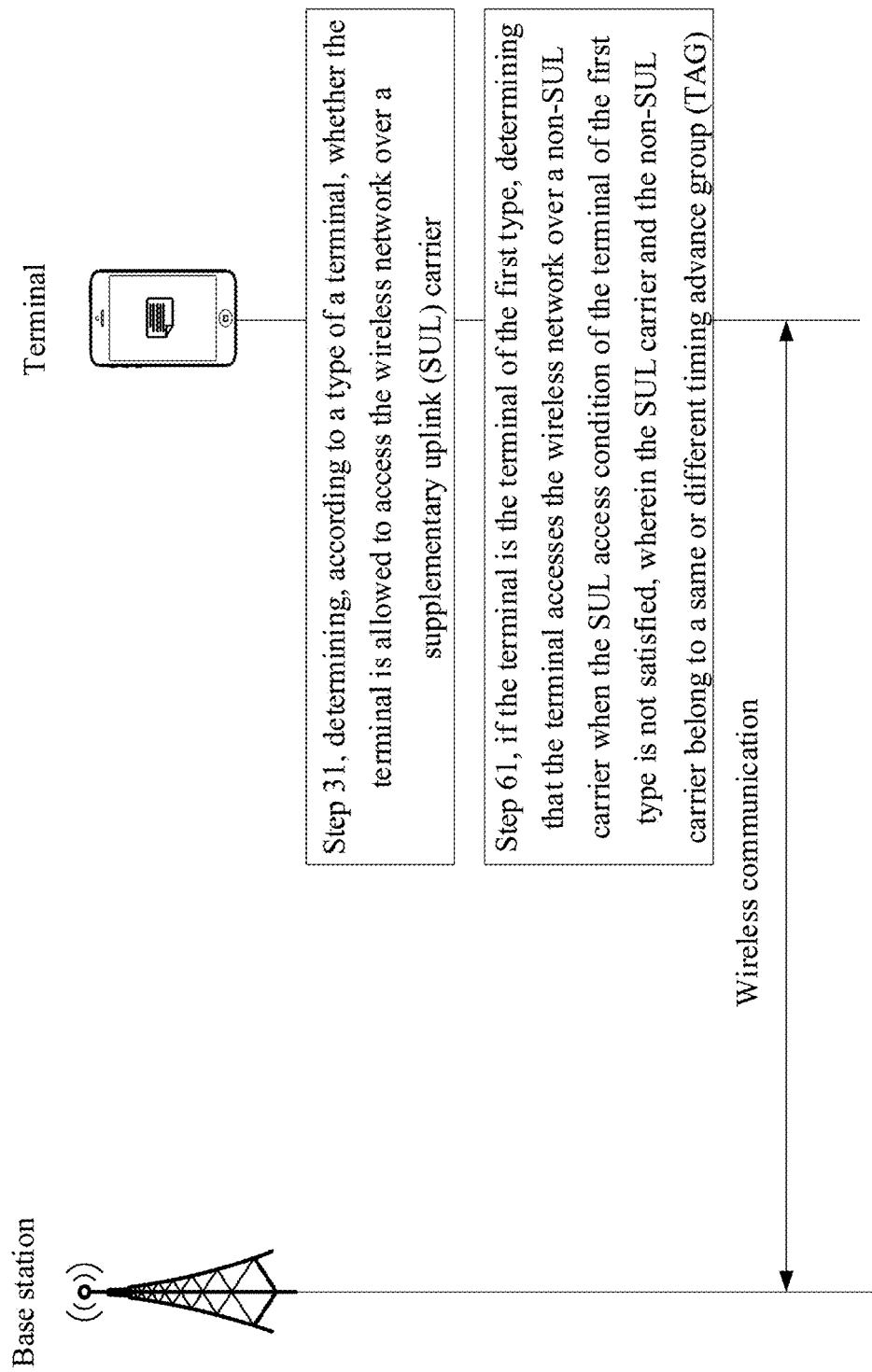
FIG. 6 is a schematic diagram of a method for accessing a wireless network according to another embodiment of the present disclosure.

As shown in FIG. 6, another embodiment of the present disclosure provides a method for accessing a wireless network, and the method further includes step 61, if the terminal is the terminal of the first type, determining that the terminal accesses the wireless network over a non-SUL carrier when the SUL access condition of the terminal of the first type is not satisfied.

The SUL carrier and the non-SUL carrier belong to a same of different timing advance group (TAG).

In an embodiment, the case of the SUL access condition of the terminal of the first type being not satisfied may be that the RSRP detected by the terminal is greater than the first power threshold.

In an embodiment, if the terminal is the terminal of the second type, it is determined that the terminal accesses the wireless network over a non-SUL carrier, when the SUL access condition of the terminal of the second type is not satisfied. The SUL carrier and the non-SUL carrier belong to a same TAG, or the SUL carrier and the non-SUL carrier belong to different TAGs.

In an embodiment, one downlink carrier and two uplink carriers are configured in a same cell. Here, the two uplink carriers are the SUL carrier and the non-SUL carrier, respectively. At the same time, the terminal can only select one carrier for uplink transmission. That is, the terminal can only select the SUL carrier for uplink transmission, or select the non-SUL carrier for uplink transmission. Here, the SUL carrier uses the low frequency band.

Here, when the terminal cannot access the wireless network over the SUL carrier, it may also access the wireless network over the non-SUL carrier, and the two access modes complement each other, which ensures smooth communication of the terminal.

Both the SUL carrier and the non-SUL carrier are configured for the terminal in the cell, and carrier frequencies of the SUL carrier and the non-SUL carrier are different. In some cases, if the frequencies of the SUL carrier and the non-SUL carrier are very different, and the attenuation values or propagation rates of the SUL carrier and the non-SUL carrier passing through a same transmission environment are different, different timing advance groups applicable to the current carrier frequency may be configured according to the SUL carrier and the non-SUL carrier. In other cases, if the frequencies of the SUL carrier and the non-SUL carrier are not much different, the timing advance of the terminal depends more on a distance between the terminal and the base station. At this time, the SUL carrier and the non-SUL carrier of a same terminal are set to have the same timing advance, so that the SUL carrier and the non-SUL carrier of the same terminal are configured to belong to the same timing advance group.

In an embodiment, the case of the SUL access condition of the terminal of the second type being not satisfied may be that the RSRP detected by the terminal is greater than the second power threshold.

In an embodiment, the SUL access condition of the terminal of the first type includes that a reference signal receiving power of the terminal of the first type is less than a first power threshold; and the SUL access condition of the terminal of the second type includes that a reference signal receiving power of the terminal of the second type is less than a second power threshold. The first power threshold is greater than the second power threshold.

In an embodiment, a number of antennas of the terminal of the first type is within a preset number range; and/or an uplink rate of the terminal of the first type when transmitting data is within a first rate range; and/or a downlink rate of the terminal of the first type when transmitting data is within a second rate range; and/or the terminal of the first type is a terminal encoding to-be-transmitted data in a preset encoding mode; and/or the terminal of the first type is a terminal with a supported bandwidth being within a preset bandwidth range; and/or the terminal of the first type is a terminal working in an enhanced coverage mode.

In an embodiment, the preset number (N) range may be in the range of $0<N<3$. N is the number of antennas in the terminal, and N is an integer.

In an embodiment, the first rate range is different from the second rate range.

In an embodiment, the preset encoding mode used by the terminal of the first type when encoding the to-be-transmitted data is different from the encoding mode used by the terminal of the second type when encoding the to-be-transmitted data.

Here, the preset encoding mode used by the terminal of the first type when encoding the to-be-transmitted data may be a lower-order modulation and encoding mode. For example, the terminal of the first type uses 32 quadrature amplitude modulation (32QAM) mode when encoding the to-be-transmitted data, and the terminal of the second type uses 64 quadrature amplitude modulation (64QAM) mode when encoding the to-be-transmitted data.

In an embodiment, the supported bandwidth within the preset range may be in the range of 5 MHz to 40 MHz. For example, the supported bandwidth is 5 MHz, 10 MHz, 40 MHz, and so on.

In an embodiment, the manner of determining whether the terminal operates in the enhanced coverage mode may include determining whether the terminal uses an RSRP smaller than a preset threshold when selecting a cell. For example, if the terminal selects the cell by using the RSRP smaller than the preset threshold, the terminal operates in the enhanced coverage mode after camping on the cell.

In an embodiment, the terminal of the first type and the terminal of the second type include different types or values of access parameter for accessing the wireless network over the SUL carrier.

In an embodiment, since the terminal of the first type needs to perform repeated transmission over the SUL, the types of access parameters for the terminal of the first type and the terminal of the second type to access the wireless network over the SUL carrier are different. In a possible implementation, the access parameter of the terminal of the first type includes the number of repeated transmissions for transmitting the preamble, while the access parameter of the terminal of the second type does not include the number of repeated transmissions for transmitting the preamble.

In an embodiment, the different values of the access parameters may be different sizes of the values. In an embodiment, the value of the access parameter of the terminal of the first type accessing the wireless network over the SUL carrier is greater than the value of the access parameter of the terminal of the second type accessing the wireless network over the SUL carrier.

In an embodiment, the access parameter includes one or more of maximum transmitting power (PCMAX,f,c), a random preamble transmitting power adjustment step (PREAMBLE_POWER_RAMPING_STEP), and a configuration parameter for requesting to acquire system information (SI) resource.

In an embodiment, the PCMAX,f,c of the terminal of the first type is greater than the PCMAX,f,c of the terminal of the second type; or the PREAMBLE_POWER_RAMPING_STEP of the terminal of the first type is greater than the PREAMBLE_POWER_RAMPING_STEP of the terminal of the second type; or when a ondemand SI resource request is initiated, the terminal of the first type acquires the SI resource by using a first configuration parameter, and the terminal of the second type acquires the SI resource by using a second configuration parameter, wherein the first configuration parameter is different from the second configuration parameter.

In an embodiment, 64 preambles are used during data transmission. The first configuration parameter includes the 1st to 32nd preambles, and the second configuration parameter includes the 33rd to 64th preambles.

In an embodiment, a first SI request parameter is configured when the terminal of the first type accesses the wireless network over the SUL carrier. A second SI request parameter is configured when the terminal of the second type accesses the wireless network over the SUL carrier. The first SI request parameter is different from the second SI request parameter.

Figure 7:
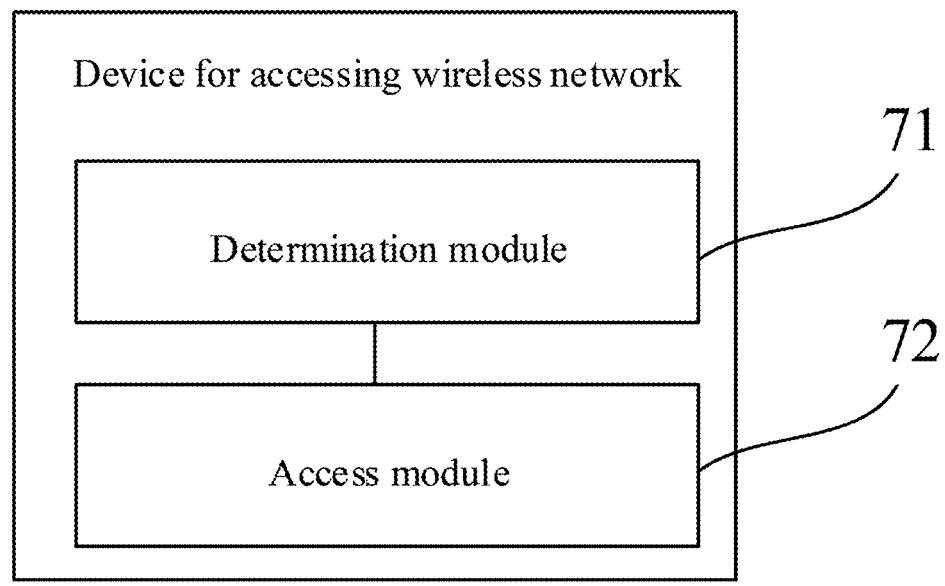
FIG. 7 is a schematic diagram of a device for accessing a wireless network according to an embodiment of the present disclosure.

As shown in FIG. 7, an embodiment of the present disclosure provides a device for accessing a wireless network, which can be applied to a terminal. The device includes a determination module 71.

The determination module 71 is configured to determine, according to a type of a terminal, whether the terminal is allowed to access the wireless network over an SUL carrier.

In an embodiment, the determination module 71 is further configured to: if the terminal is a terminal of a first type, determine that the terminal is allowed to access the wireless network over the SUL carrier; or if the terminal is the terminal of the first type, determine that the terminal is allowed to access the wireless network over the SUL carrier when a SUL access condition of the terminal of the first type is satisfied.

In an embodiment, the determination module 71 is further configured to: if the terminal is a terminal of a second type, determine that the terminal is allowed to access the wireless network over the SUL carrier when a SUL access condition of the terminal of the second type is satisfied, wherein the SUL access condition of the terminal of the first type is looser than the SUL access condition of the terminal of the second type.

In an embodiment, the determination module 71 is further configured to: if the terminal is the terminal of the first type, determine that the terminal accesses the wireless network over a non-SUL carrier when the SUL access condition of the terminal of the first type is not satisfied, wherein the SUL carrier and the non-SUL carrier belong to a same timing advance group (TAG), or the SUL carrier and the non-SUL carrier belong to different timing advance groups (TAGs).

In an embodiment, the determination module is further configured so that: the SUL access condition of the terminal of the first type includes that a reference signal receiving power of the terminal of the first type is less than a first power threshold; and the SUL access condition of the terminal of the second type includes that a reference signal receiving power of the terminal of the second type is less than a second power threshold, wherein the first power threshold is greater than the second power threshold.

In an embodiment, the determination module 71 is further configured so that: a number of antennas of the terminal of the first type is within a preset number range; and/or an uplink rate of the terminal of the first type when transmitting data is within a first rate range; and/or a downlink rate of the terminal of the first type when transmitting data is within a second rate range; and/or the terminal of the first type is a terminal encoding to-be-transmitted data in a preset encoding mode; and/or the terminal of the first type is a terminal with a supported bandwidth being within a preset bandwidth range; and/or the terminal of the first type is a terminal operating in an enhanced coverage mode.

In an embodiment, the device further includes an access module 72, which is configured so that the terminal of the first type and the terminal of the second type include different types or values of access parameter for accessing the wireless network over the SUL carrier.

In an embodiment, the access module 72 is further configured so that the access parameter includes one or more of a maximum transmitting power (PCMAX,f,c), a random preamble transmitting power adjustment step (PREAMBLE_POWER_RAMPING_STEP), a configuration parameter for requesting to acquire system information (SI) resource.

In an embodiment, the access module 72 is further configured so that: the PCMAX,f,c of the terminal of the first type is greater than the PCMAX,f,c of the terminal of the second type; or the PREAMBLE_POWER_RAMPING_STEP of the terminal of the first type is greater than the PREAMBLE_POWER_RAMPING_STEP of the terminal of the second type; or when a ondemand SI resource request is initiated, the terminal of the first type acquires the SI resource by using a first configuration parameter, and the terminal of the second type acquires the SI resource by using a second configuration parameter, wherein the first configuration parameter is different from the second configuration parameter.

An embodiment of the present disclosure also provide a communication device, including an antenna, a memory, and a processor, respectively coupled to the antenna and the memory. The processor can be configured to, by executing executable programs stored in the memory, control the antenna to transmit and receive wireless signal and perform the steps in the method according to any one of the above-described embodiments.

The communication device provided in the embodiment may be the aforementioned terminal or base station. The terminal may be various human-carrying terminals or vehicle-mounted terminals. The base station may be various types of base stations, for example, a 4G base station or a 5G base station.

The antennas may be various types of antennas, for example, mobile antennas such as 3G antennas, 4G antennas, or 5G antennas, and the antennas may also include WiFi antennas or wireless charging antennas.

The memory may include various types of storage media, which are non-transitory computer storage media that can memorize the information stored thereon after the communication device is powered off.

The processor may be connected to the antenna and the memory through a bus or the like, and is used to read an executable program stored in the memory, for example, at least one of the methods shown in any embodiment of the present disclosure.

An embodiment of the present disclosure further provides a non-transitory computer-readable storage medium storing executable programs which, when being executed by a processor, can implement the steps in the method according to any one of the above-described embodiments, for example, at least one of the methods shown in any embodiment of the present disclosure.

Figure 8:
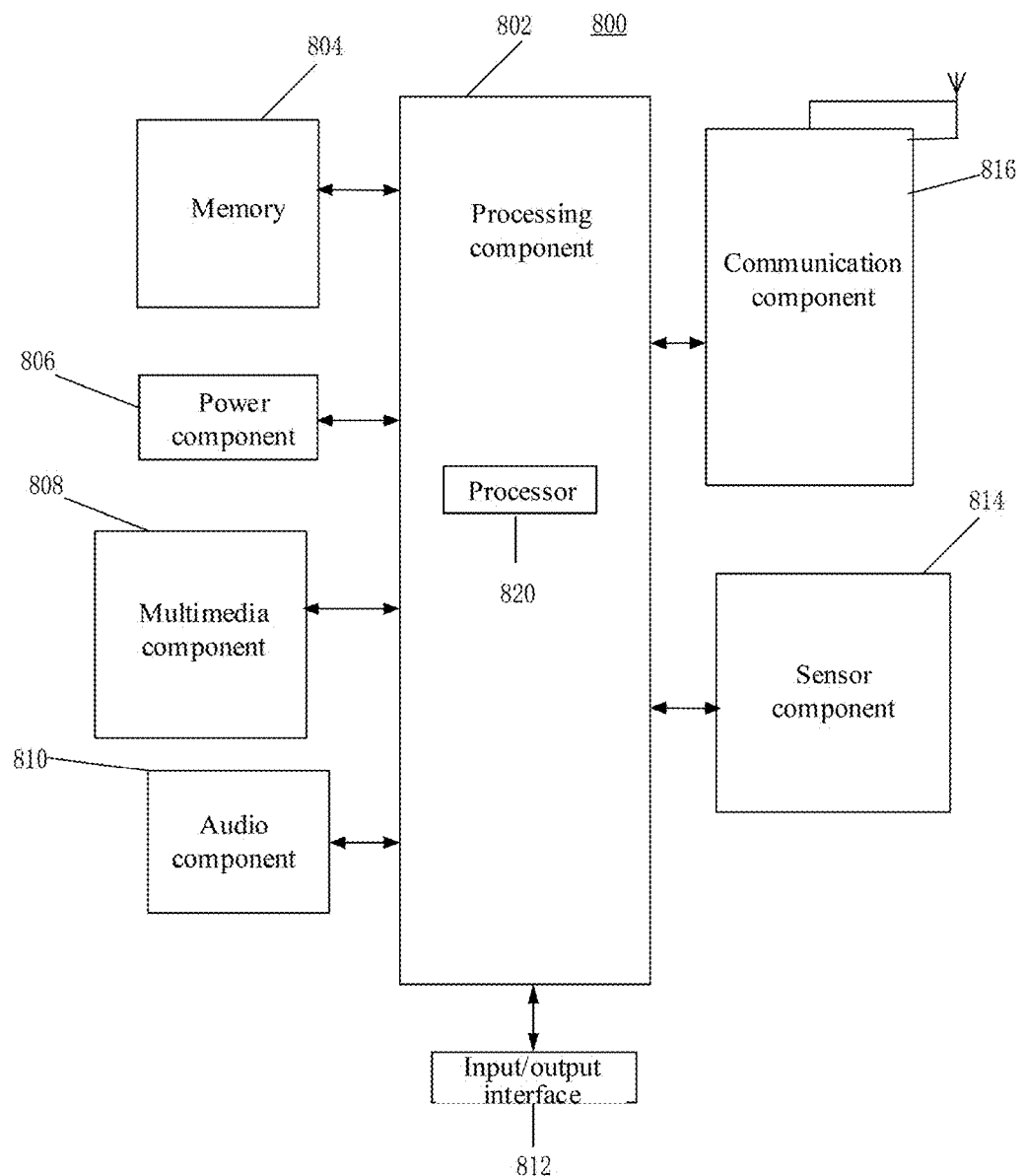
FIG. 8 is a schematic structural diagram of a terminal according to an embodiment of the present disclosure.

As shown in FIG. 8, an embodiment of the present disclosure provides a structure of a terminal.

Referring to FIG. 8, an embodiment provides a terminal 80. The terminal may be a mobile phone, a computer, a digital broadcasting terminal, a messaging device, a game console, a tablet device, a medical device, a fitness device, a personal digital assistant, or the like.

Referring to FIG. 8, the terminal 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support the operation at the device 800. Examples of these data include instructions for any application or method operating on the terminal 800, contact data, phone book data, messages, pictures, videos and the like. The memory 804 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 806 provides power to various components of the terminal 800. The power component 806 may include a power management system, one or more power supplies, and other components associated with generating, managing, and distributing power for the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 808 includes a front camera and/or a rear camera. When the device 800 is in an operation mode, such as a shooting mode or a video mode, the front camera and/or the rear camera can receive external multimedia data. Each front camera and rear camera may be a fixed optical lens system or have focal length and optical zoom capabilities.

The audio component 810 is configured to output and/or input audio signals. For example, the audio component 810 includes a microphone (MIC), and when the terminal 800 is in an operation mode, such as a call mode, a recording mode, and a voice recognition mode, the microphone is configured to receive an external audio signal. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to home button, volume button, start button, and lock button.

The sensor component 814 includes one or more sensors for providing the terminal 800 with various aspects of state evaluation. For example, the sensor component 814 can detect the on/off status of the terminal 800 and the relative positioning of components. For example, the component is a display and keypad of the terminal 800. The sensor component 814 can also detect the position change of the terminal 800 or a component of the terminal 800, the presence or absence of contact between the user and the terminal 800, the orientation or acceleration/deceleration of the terminal 800, and the temperature change of the terminal 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as WiFi, 2G, or 3G, or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 800 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An exemplary embodiment also provides a non-transitory computer-readable storage medium including instructions, such as the memory 804 including instructions, and the instructions may be executed by the processor 820 of the terminal 800 to complete the foregoing method. For example, the non-transitory computer-readable storage medium may be ROM, random access memory (RAM), CD-ROM, magnetic tape, floppy disk, optical data storage device and the like.

The terminal may be used to implement the above method, for example, the method in any embodiment of the present disclosure.

Figure 9:
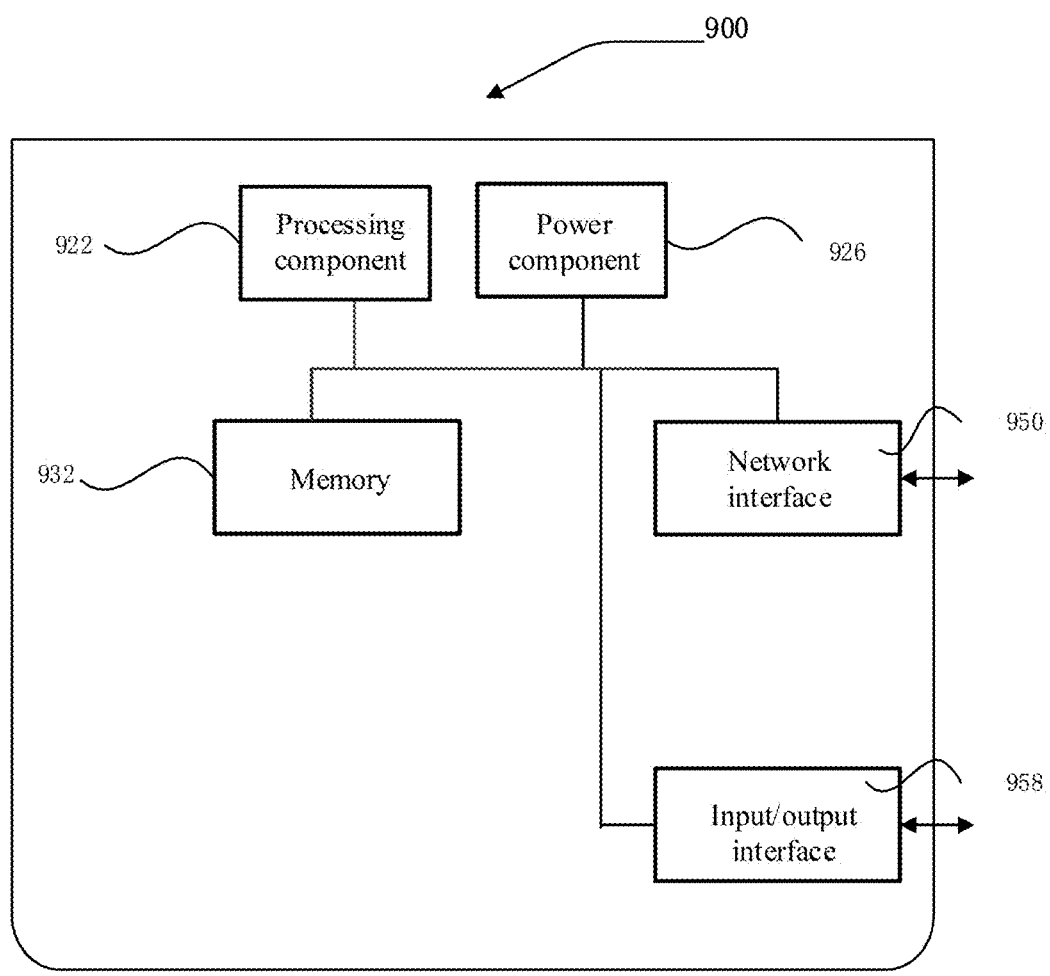
FIG. 9 is a schematic structural diagram of a base station according to an embodiment of the present disclosure.

As shown in FIG. 9, an embodiment of the present disclosure provides a structure of a base station. For example, the base station 900 may be provided as a device at the network side. Referring to FIG. 9, the base station 900 includes a processing component 922 which further includes one or more processors, and a memory resource which is represented by a memory 932 and is configured for storing instructions such as application programs executable by the processing component 922. The application program stored in the memory 932 may include one or more modules each corresponding to a set of instructions. Furthermore, the processing component 922 is configured to execute instructions to perform any one of the above methods, for example, the method in any embodiment of the present disclosure.

The base station 900 may also include a power component 926 configured to perform power management of the base station 900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, Free BSD™ or the like.

The wireless network interface 950 includes but is not limited to the antenna in the above communication device.

Those skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims

What is claimed is:

1. A method for accessing a wireless network, comprising:
    determining, according to a type of a terminal, whether the terminal is allowed to access the wireless network over a supplementary uplink (SUL) carrier,
    wherein determining, according to the type of the terminal, whether the terminal is allowed to access the wireless network over the SUL carrier comprises:
    in response to determining that the terminal is a terminal of a first type, determining that the terminal is allowed to access the wireless network over the SUL carrier when a SUL access condition of the terminal of the first type is satisfied; and
    in response to determining that the terminal is a terminal of a second type, determining that the terminal is allowed to access the wireless network over the SUL carrier when a SUL access condition of the terminal of the second type is satisfied,
    wherein the SUL access condition of the terminal of the first type comprises that a reference signal receiving power of the terminal of the first type is less than a first power threshold, the SUL access condition of the terminal of the second type comprises that a reference signal receiving power of the terminal of the second type is less than a second power threshold, and the first power threshold is greater than the second power threshold.

2. The method according to claim 1, further comprising:
    in response to determining that the terminal is the terminal of the first type, determining that the terminal accesses the wireless network over a non-SUL carrier when the SUL access condition of the terminal of the first type is not satisfied,
    wherein the SUL carrier and the non-SUL carrier belong to a same timing advance group (TAG), or the SUL carrier and the non-SUL carrier belong to different timing advance groups (TAGs).

3. The method according to claim 1, wherein the terminal of the first type comprises at least one of the following characteristics:
    a number of antennas of the terminal of the first type being within a preset number range;
    an uplink rate of the terminal of the first type when transmitting data being within a first rate range;
    a downlink rate of the terminal of the first type when transmitting data being within a second rate range;
    the terminal of the first type being a terminal encoding to-be-transmitted data in a preset encoding mode;
    the terminal of the first type being a terminal with a supported bandwidth being within a preset bandwidth range; or
    the terminal of the first type being a terminal operating in an enhanced coverage mode.

4. The method according to claim 1, wherein the terminal of the first type and the terminal of the second type comprise different types or values of access parameter for accessing the wireless network over the SUL carrier.

5. The method according to claim 4, wherein the access parameter comprises one or more of a maximum transmitting power (PCMAX,f,c), a random preamble transmitting power adjustment step (PREAMBLE_POWER_RAMPING_STEP), a configuration parameter for requesting to acquire system information (SI) resource.

6. The method according to claim 5, wherein
    the PCMAX,f,c of the terminal of the first type is greater than the PCMAX,f,c of the terminal of the second type; or
    the PREAMBLE_POWER_RAMPING_STEP of the terminal of the first type is greater than the PREAMBLE_POWER_RAMPING_STEP of the terminal of the second type; or
    when a ondemand SI resource request is initiated, the terminal of the first type acquires the SI resource by using a first configuration parameter, and the terminal of the second type acquires the SI resource by using a second configuration parameter, wherein the first configuration parameter is different from the second configuration parameter.

7. A non-transitory computer-readable storage medium storing computer-executable instructions which, after being executed by a processor, implement actions comprising:
    determining, according to a type of a terminal, whether the terminal is allowed to access the wireless network over a supplementary uplink (SUL) carrier,
    wherein determining, according to the type of the terminal, whether the terminal is allowed to access the wireless network over the SUL carrier comprises:
    in response to determining that the terminal is a terminal of a first type, determining that the terminal is allowed to access the wireless network over the SUL carrier when a SUL access condition of the terminal of the first type is satisfied; and in response to determining that the terminal is a terminal of a second type, determining that the terminal is allowed to access the wireless network over the SUL carrier when a SUL access condition of the terminal of the second type is satisfied, wherein the SUL access condition of the terminal of the first type comprises that a reference signal receiving power of the terminal of the first type is less than a first power threshold, the SUL access condition of the terminal of the second type comprises that a reference signal receiving power of the terminal of the second type is less than a second power threshold, and the first power threshold is greater than the second power threshold.

8. The non-transitory computer-readable storage medium according to claim 7, wherein the actions further comprise:

in response to determining that the terminal is the terminal of the first type, determining that the terminal accesses the wireless network over a non-SUL carrier when the SUL access condition of the terminal of the first type is not satisfied, wherein the SUL carrier and the non-SUL carrier belong to a same timing advance group (TAG), or the SUL carrier and the non-SUL carrier belong to different timing advance groups (TAGs).

9. The non-transitory computer-readable storage medium according to claim 7, wherein the terminal of the first type comprises at least one of the following characteristics:

a number of antennas of the terminal of the first type being within a preset number range;

an uplink rate of the terminal of the first type when transmitting data being within a first rate range;

a downlink rate of the terminal of the first type when transmitting data being within a second rate range;

the terminal of the first type being a terminal encoding to-be-transmitted data in a preset encoding mode;

the terminal of the first type being a terminal with a supported bandwidth being within a preset bandwidth range; or the terminal of the first type being a terminal operating in an enhanced coverage mode.

10. The non-transitory computer-readable storage medium according to claim 7, wherein the terminal of the first type and the terminal of the second type comprise different types or values of access parameter for accessing the wireless network over the SUL carrier.

11. The non-transitory computer-readable storage medium according to claim 10, wherein the access parameter comprises one or more of a maximum transmitting power ($P_{CMAX,f,c}$), a random preamble transmitting power adjustment step (PREAMBLE_POWER_RAMPING_STEP), a configuration parameter for requesting to acquire system information (SI) resource.

12. The non-transitory computer-readable storage medium according to claim 11, wherein the $P_{CMAX,f,c}$ of the terminal of the first type is greater than the $P_{CMAX,f,c}$ of the terminal of the second type; or the PREAMBLE_POWER_RAMPING_STEP of the terminal of the first type is greater than the PREAMBLE_POWER_RAMPING_STEP of the terminal of the second type; or when a ondemand SI resource request is initiated, the terminal of the first type acquires the SI resource by using a first configuration parameter, and the terminal of the second type acquires the SI resource by using a second configuration parameter, wherein the first configuration parameter is different from the second configuration parameter.

13. A device for accessing a wireless network, comprising:

a processor; and a memory storing instructions executable by the processor, wherein the processor is configured to execute the instructions to implement:

determining, according to a type of a terminal, whether the terminal is allowed to access the wireless network over a supplementary uplink (SUL) carrier;

wherein determining, according to the type of the terminal, whether the terminal is allowed to access the wireless network over the SUL carrier comprises:

in response to determining that the terminal is a terminal of a First type, determining that the terminal is allowed to access the wireless network over the SUL carrier when a SUL access condition of the terminal of the first type is satisfied; and in response to determining that the terminal is a terminal of a second type, determining that the terminal is allowed to access the wireless network over the SUL carrier when a SUL access condition of the terminal of the second type is satisfied, wherein the SUL access condition of the terminal of the first type comprises that a reference signal receiving power of the terminal of the first type is less than a first power threshold, the SUL access condition of the terminal of the second type comprises that a reference signal receiving power of the terminal of the second type is less than a second power threshold, and the first power threshold is greater than the second power threshold.

14. The device according to claim 13, wherein the processor is configured to execute the instructions to further implement:

in response to determining that the terminal is the terminal of the first type, determining that the terminal accesses the wireless network over a non-SUL carrier when the SUL access condition of the terminal of the first type is not satisfied, wherein the SUL carrier and the non-SUL carrier belong to a same timing advance group (TAG), or the SUL carrier and the non-SUL carrier belong to different timing advance groups (TAGs).

15. The device according to claim 13, wherein the terminal of the first type comprises at least one of the following characteristics:

a number of antennas of the terminal of the first type being within a preset number range;

an uplink rate of the terminal of the first type when transmitting data being within a first rate range;

a downlink rate of the terminal of the first type when transmitting data being within a second rate range;

the terminal of the first type being a terminal encoding to-be-transmitted data in a preset encoding mode;

the terminal of the first type being a terminal with a supported bandwidth being within a preset bandwidth range; or the terminal of the first type being a terminal operating in an enhanced coverage mode.

16. The device according to claim 13, wherein the terminal of the first type and the terminal of the second type comprise different types or values of access parameter for accessing the wireless network over the SUL carrier.

17. The device according to claim 16, wherein the access parameter comprises one or more of a maximum transmitting power ($P_{CMAX,f,c}$), a random preamble transmitting power adjustment step (PREAMBLE_POWER_RAMPING_STEP), a configuration parameter for requesting to acquire system information (SI) resource.

18. The device according to claim 17, wherein the $P_{CMAX,f,c}$ of the terminal of the first type is greater than the $P_{CMAX,f,c}$, of the terminal of the second type; or the PREAMBLE_POWER_RAMPING_STEP of the terminal of the first type is greater than the PREAMBLE_POWER_RAMPING_STEP of the terminal of the second type; or when a ondemand SI resource request is initiated, the terminal of the first type acquires the SI resource by using a first configuration parameter, and the terminal of the second type acquires the SI resource by using a second configuration parameter, wherein the first configuration parameter is different from the second configuration parameter.

\* \* \* \* \*